Dec. 16, 1947.   W. H. BOGHOSIAN ET AL   2,432,504
TARGET AZIMUTH DEVICE
Filed Sept. 17, 1943   3 Sheets-Sheet 1

INVENTORS W. H. BOGHOSIAN
H. G. OCH
BY
*W. H. Dawson*
ATTORNEY

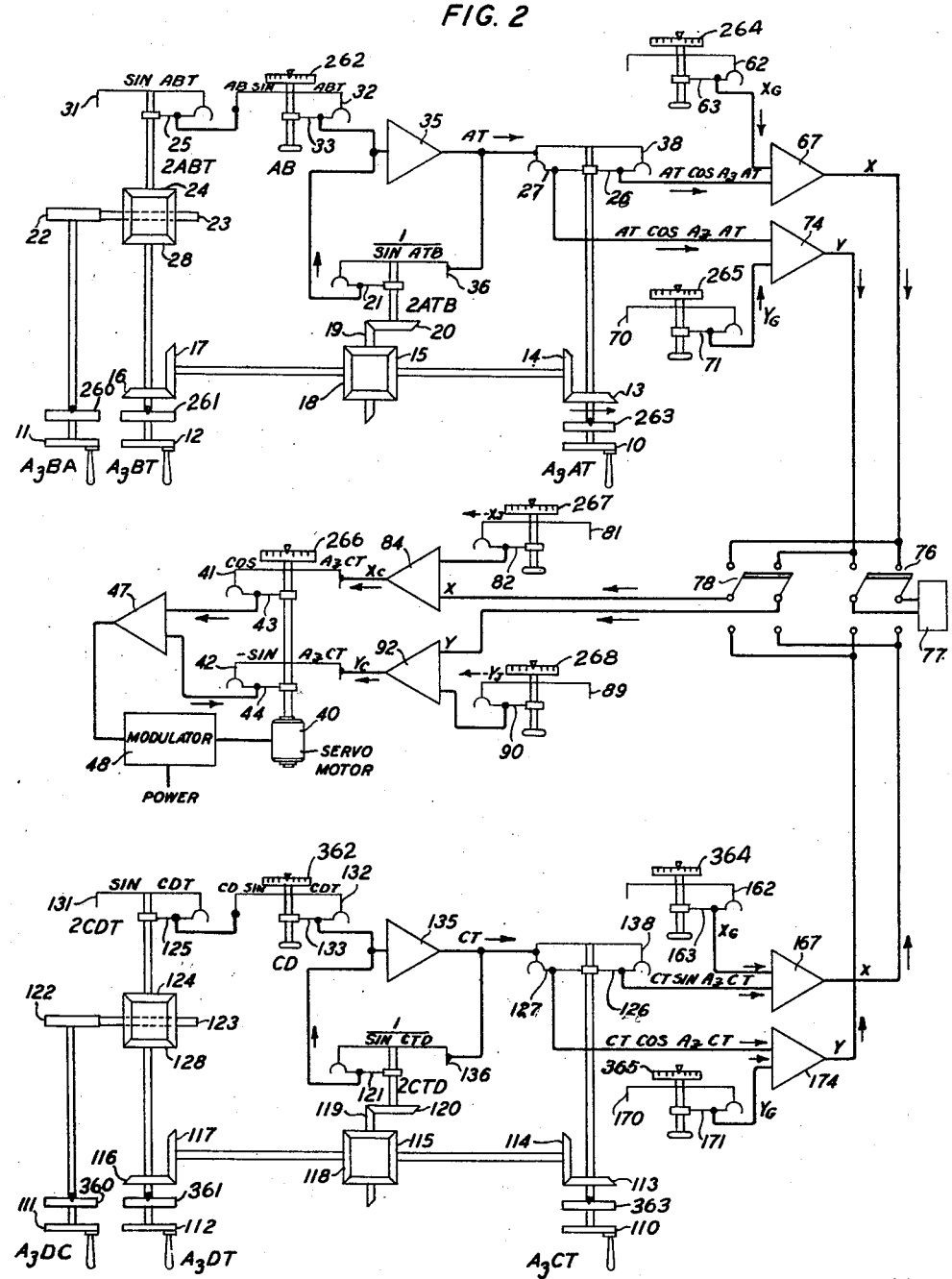

INVENTORS W. H. BOGHOSIAN
H. G. OCH

ATTORNEY

Patented Dec. 16, 1947

2,432,504

UNITED STATES PATENT OFFICE 2,432,504

TARGET AZIMUTH DEVICE

William H. Boghosian, Forest Hills, and Henry G. Och, New York, N. Y., assignors to Bell Telephone Laboratories, Incorporated, New York, N. Y., a corporation of New York Application September 17, 1943, Serial No. 502,794

6 Claims. (Cl. 235—61.5)

This invention relates to the control of artillery fire, and particularly to the determination of the azimuth of a target.

The object of the invention is a method and means of determining the azimuth of a target with respect to an observing station from observations of the target made at another observing station.

Figure 1:
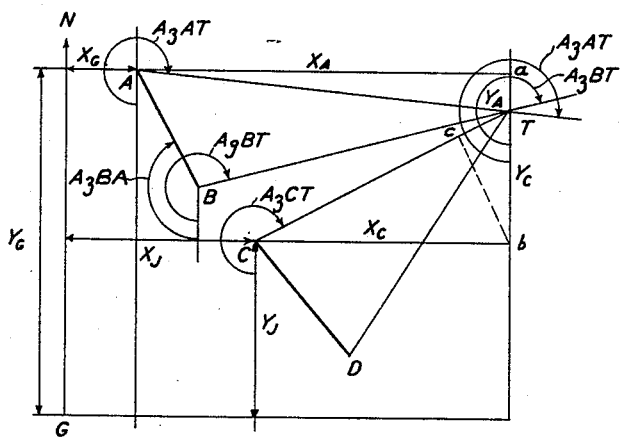
Figure 4:
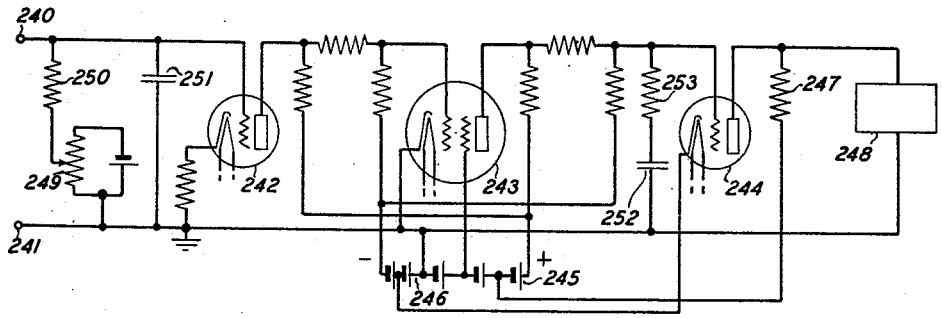
Figure 5:
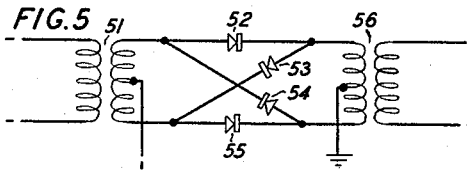
Figure 6:
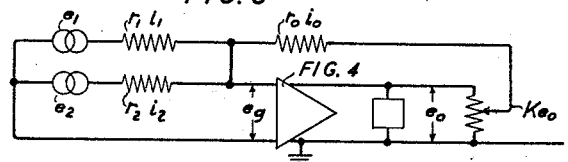
Figure 3:
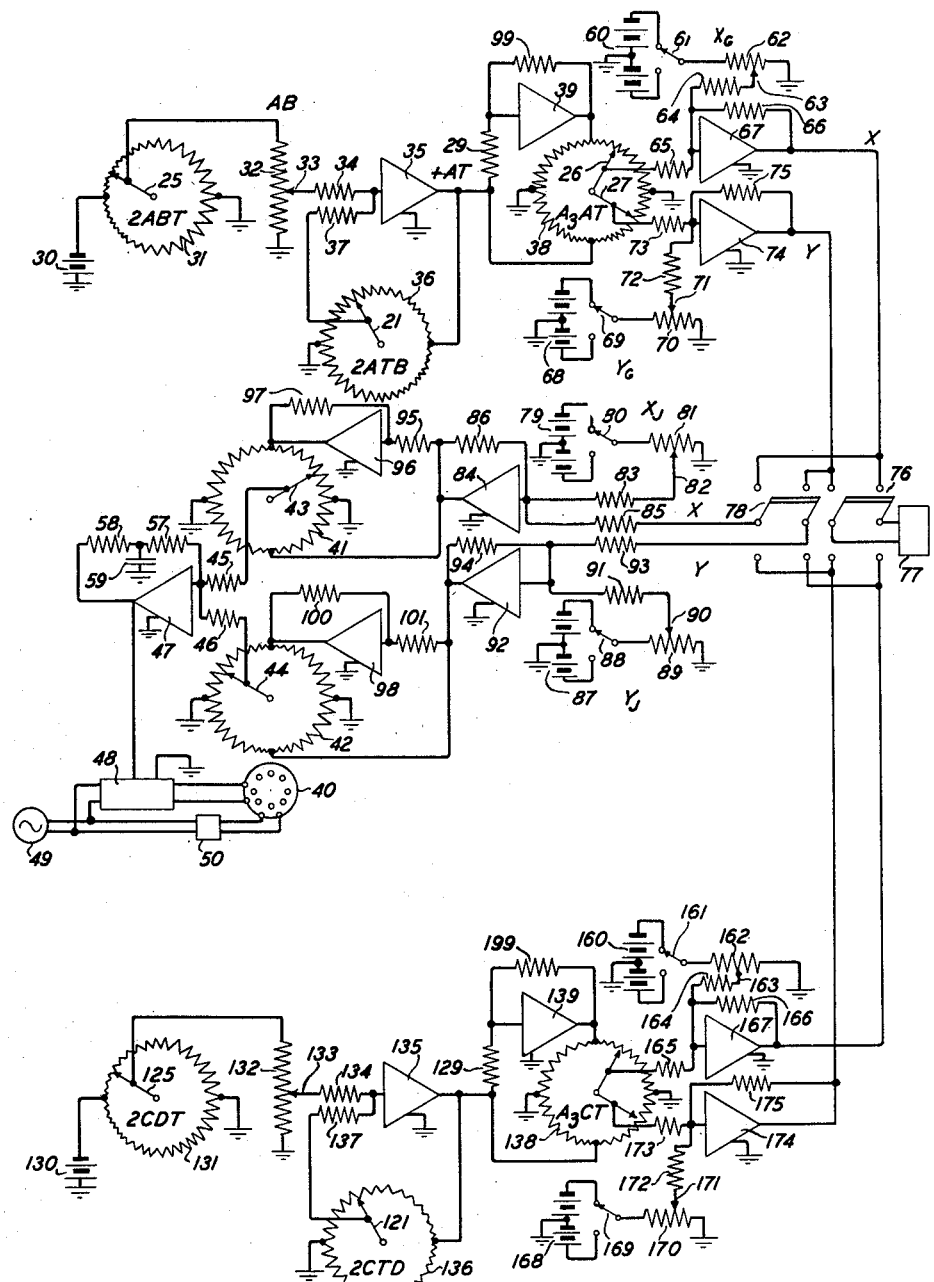

On the drawings:

Fig. 1 diagrammatically shows the geometrical relationships involved;

Fig. 2 diagrammatically and schematically shows a typical embodiment of the invention;

Fig. 3 schematically shows the circuits of Fig. 2;

Fig. 4 schematically shows an amplifier forming part of the system of Fig. 2;

Fig. 5 schematically shows a modulator forming part of the system of Fig. 2; and Fig. 6 is a diagram illustrating the operation of the amplifier of Fig. 4.

In Fig. 1, A and B are two observation stations, located at the ends of a known base line AB and observing a common target T. C and D are two other observation stations located at the ends of the known base line CD. From the observations made at the stations A and B, the polar coordinates of the target with respect to one of the stations are computed, and these polar coordinates are transformed into rectilinear coordinates with respect to the gun position. Corrections for the parallax between a third station and the gun position are applied to these values of the rectilinear coordinates, and the corrected values are used to compute the azimuth of the target with respect to the third station.

For convenience, assume the astronomical convention in which azimuth is measured from south, through west, north, east and designate azimuths by Az followed by letters indicating the limiting points.

$$\text{angle } ATB = AzAT - AzBT$$

$$\text{angle } ABT = AzBT - AzBA$$

$$\frac{AT}{\sin ABT} = \frac{AB}{\sin ATB}$$

$$AT = AB \cdot \frac{\sin ABT}{\sin ATB} \quad (1)$$

$$= AB \cdot \frac{\sin (AzBT - AzBA)}{\sin (AzAT - AzBT)} \quad (2)$$

Assume a system of rectangular coordinates having the origin at G, the gun to be controlled, the X axis being east-west and the Y axis being north-south.

The coordinates $X_G$ and $Y_G$ of A with respect to the gun G may be determined by known surveying methods.

The coordinates of the station A with respect to the target T are $X_A = Aa$ and $Y_A = Ta$, thus $$X_A = AT \cos aAT$$

$$= AT \sin AzAT \quad (3)$$

$$-Y_A = AT \sin aAT$$

$$= AT \cos AzAT \quad (4)$$

The coordinates $X_J$ and $Y_J$ of a third station C with respect to the gun G may be determined by known surveying methods.

The coordinates of the station C with respect to the target T are $X_C = Cb$ and $Y_C = bT$.

The coordinates X and Y of the target T with respect to the gun G are $$X = X_G + X_A = X_J + X_C \quad (5)$$

$$Y = Y_G - Y_A = Y_J + Y_C \quad (6)$$

Also, $$X_C = X - X_J \text{ and } Y_C = Y - Y_J$$

Then, in triangle Ccb, $$bc = X_C \sin cCb$$

$$= -X_C \cos AzCT$$

and in triangle Tbc, $$bc = Y_C \cos Tbc$$

$$= Y_C \cos TCb$$

$$= -Y_C \sin AzCT$$

And, $$-X_C \cos AzCT + Y_C \sin AzCT = 0 \quad (7)$$

From Equation 7, if $X_C$ and $Y_C$ are known, AzCT may be computed.

The observing stations A, B, C, D are equipped with optical or radio means for measuring the azimuths AzAT, AzBT, and setting the azimuth AzCT. These optical means may be simple forms of theodolites, arranged to measure azimuths, or any other suitable observing devices.

The observed angles are transmitted to the computing station by any desired data transmission system, such as the known self-synchronous system; or the readings of the theodolite may be telephoned at regular intervals to the computing station, together with readings transmitted by a data transmission system, such, for example, as shown in United States Patents 1,471,708, October 23, 1923, J. L. Routin or 1,483,235, February 12, 1924, R. V. Morse.

While only two pairs of observing stations, AB and CD are shown, many other pairs of stations may be used. The computing station will generally be located somewhere in the middle of the area containing the observing stations, and preferably in the vicinity of the gun.

In Fig. 2, the handwheel 10 is rotated in accordance with the received values of the azimuth AzAT as shown by dial 263. The handwheel 11 is rotated to the known azimuth AzBA, as shown by dial 260 of the base line AB. The handwheel 12 is rotated in accordance with the received values of the azimuth AzBT as shown by dial 261. If desired, the handwheels 10 and 12 may control known tracking aids having motors and variable speed drives to drive the shafts associated with the handwheels.

The handwheel 10 drives, through gears 13 and 14, a pinion 15 of a differential gear, and the handwheel 12 drives, through gears 16 and 17, the other pinion 18 of the same differential gear. The ring gear 19 and gear 20 drive the potentiometer brush 21. If the handwheels 10 and 12 are rotated in accordance with azimuths AzAT and AzBT, the ring gear 19 will rotate in accordance with the difference of the azimuths, that is, with the angle ATB. The ratio of gears 19 and 20 is such that the brush 21 turns through angle 2ATB.

The handwheel 12 also turns the pinion 28 of a second differential gear. The handwheel 11, through gear 22, drives the ring gear 23 of the same differential gear. The pinion 24 of this differential gear will rotate with the difference of the azimuths, that is, the angle ABT. The ratio of the gears is such that brush 25 turns through the angle 2ABT.

The handwheel 10 also rotates the potentiometer brushes 26, 27.

In Fig. 3, a grounded source of voltage 30 is connected to a tap on the potentiometer winding 31, a diametrically opposite tap of the winding 31 being grounded, so that current from the source 30 flows in both portions of the winding.

The potentiometer windings, such as winding 31, shown on Fig. 3, may conveniently be in the usual form of fine resistance wire wound closely and evenly on a flat card of insulating material. As diagrammatically indicated on Fig. 2, these cards are supported in circles concentric with the shafts moving the brushes. The width of a card varies with the derivative of the desired voltage function, modified, if necessary, to account for any current that may be drawn by the load attached to the brush.

The potentiometer winding 31 produces a voltage variation proportional to sin ABT, thus the width of the card has approximately a cosinusoidal variation. As the angle ABT will not exceed 180 degrees, to secure greater accuracy in the selected voltages, the winding 31 may be spread over 360 degrees, and the gearing arranged to rotate the brush 25 through twice the angle ABT.

As the angle ABT is in the first and second quadrants, sin ABT is always of the same sign, thus the same polarity from the source 30 is applied to both sections of the winding 31. At zero angle and at 180 degrees, the sine is zero, thus, these points are represented by the grounded tap, while 90 degrees is represented by the tap to which the source 30 is connected.

The voltage selected by the brush 25 is applied to the potentiometer winding 32. The brush 33 is manually adjusted to fractionate this voltage proportionally to the base line AB as indicated on dial 262. The voltage selected by the brush 33 will thus be proportional to AB sin ABT, and this voltage is supplied, through resistor 34, to the input of a summing amplifier 35, which may be of the type shown in Fig. 4.

In Fig. 3, potentiometers producing voltages representing variable quantities are shown as having circular cards, while potentiometers, such as 32, producing voltages representing constant quantities are shown as having straight cards. However, as shown in Fig. 2, all the potentiometers may have circular cards.

The summing amplifier shown in Fig. 4 is essentially a three-stage, high gain amplifier. As the applied voltages may be of low frequency, the interstage coupling networks may be of the type shown in United States Patent 1,751,527, March 25, 1930, H. Nyquist.

The signal voltage is applied to the input terminal 240, the other input terminal 241 being grounded. Terminal 240 is connected to the control electrode of the first vacuum tube 242; thus, the signal voltage is amplified in vacuum tubes 242, 243 and applied to the control electrode of vacuum tube 244.

The anode and biasing voltages for the vacuum tubes are supplied by a source of voltage 245 having a grounded intermediate tap 246. The cathodes of the vacuum tubes 242, 243, 244 are heated in the usual manner by known means (not shown).

Positive voltage is supplied by the source 245, through resistor 247 to the anode of vacuum tube 244. Negative voltage is supplied by the source 245 to the cathode of vacuum tube 244. These voltages are adjusted so that, in the absence of a signal voltage applied to the amplifier, the sections of the source 245, the resistance of resistor 247 and the anode-cathode resistance of vacuum tube 244 form a balanced bridge. The anode of vacuum tube 244, and the grounded tap 246 of source 245 are conjugate points at the same potential. Thus, no voltage is applied to the grounded load 248.

To assist in precisely balancing the amplifier to zero output voltage, a small biasing voltage from potentiometer 249 may be applied through resistor 250 to the control electrode of vacuum tube 242 and adjusted until the voltage across the load 248 is zero.

The capacitors 251, 252 and resistor 253 compensate for undesired phase shifts in the amplifier.

When a signal voltage is applied to the control electrode of vacuum tube 242, and the amplified voltage is applied to the control electrode of vacuum tube 244, the anode-cathode resistance of vacuum tube 244 will be changed, unbalancing the bridge and causing a voltage to be applied across the load 248.

As the amplifier has an odd number of stages, the polarity of the voltage applied across the load will be opposite to the signal voltage, that is, the amplifier reverses the polarity of the signal voltage. Thus, to have the output of amplifier 35, Fig. 3, of positive polarity, the voltage from source 30 is of negative polarity.

In Fig. 6, two sources of voltages $e_1$, $e_2$, respectively, supply currents $i_1$, $i_2$ through resistances $r_1$, $r_2$ to the input of an amplifier of the type shown in Fig. 4. The output voltage $e_0$ of the amplifier is supplied to the winding of a potentiometer. The brush of the potentiometer is adjusted to select a voltage $Ke_0$, which supplies a current $-i_0$ through a resistance $r_0$ to the input of the amplifier. As the amplifier has an odd number of stages, the feedback is degenerative. Let the voltage at the input of the amplifier be $e_g$ and the voltage amplification of the amplifier be $\mu$.

The control electrode of the first vacuum tube of the amplifier is a current node; thus, applying Kirchoff's law $$i_1 + i_2 = -i_0$$

or $$i_1 + i_2 + i_0 = 0$$

$$e_g = e_1 - i_1 r_1 = e_2 - i_2 r_2 = K e_0 - i_0 r_0$$

$$e_0 = -\mu e_g.$$

Then, $$K e_0 = \frac{-\left(e_1 \frac{r_0}{r_1} + e_2 \frac{r_0}{r_2}\right)}{1 + \frac{\left(1 + \frac{r_0}{r_1} + \frac{r_0}{r_2}\right)}{\mu K}}$$

or $$e_0 = -\frac{1}{K}\left[\frac{e_1 \frac{r_0}{r_1} + e_2 \frac{r_0}{r_2}}{1 + \frac{\left(1 + \frac{r_0}{r_1} + \frac{r_0}{r_2}\right)}{\mu K}}\right]$$

Using modern vacuum tubes, the voltage amplification $\mu$ of a three-stage amplifier may easily be made from 15,000 to 30,000. Thus, if $r_0$, $r_1$, $r_2$ are of the same order, the denominator of the bracketed quantity is substantially unity. Thus, $$e_0 = -\frac{1}{K}\left(e_1 \frac{r_0}{r_1} + e_2 \frac{r_0}{r_2}\right)$$

If the potentiometer brush be at the top, so that the feedback is taken from the anode of the output tube, $K=1$ and $$e_0 = -\left(e_1 \frac{r_0}{r_1} + e_2 \frac{r_0}{r_2}\right) \quad (8)$$

If $r_0 = r_1 = r_2$, the output voltage will equal the sum of the applied voltages, with reversed polarity. Also, for a single input, with $r_0 = r_1$, and the feedback taken off the potentiometer, $$e_0 = -\frac{e_1}{K} \quad (9)$$

That is, in effect, the amplifier divides the amplitude of the voltage applied to the input circuit by K, and K may be any function defined by the variation in the resistance of the potentiometer winding.

In Fig. 3, the output voltage of the summing amplifier 35 is applied across the potentiometer winding 36. The potentiometer winding 36 varies in resistance like the winding 31. The brush 21 is rotated through the angle 2ATB to select a voltage proportional to sin ATB which is applied through resistor 37 to the input of amplifier 35.

If the resistance of resistors 34, 37 are equal, then, from Equation 9, the output voltage $$e_0 = \frac{e_1}{\sin ATB}$$

But, the input voltage is proportional to $$AB \sin ABT$$

Thus the output voltage of amplifier 35 is proportional to $$AB \frac{\sin ABT}{\sin ATB}$$

that is, from Equation 1 to AT.

The output voltage of amplifier 35, proportional to AT is applied to the lower sections of the potentiometer winding 38.

The output voltage of amplifier 35 is also applied through amplifier 39 to the upper sections of the potentiometer winding 38. The amplifier 39 is of the type shown in Fig. 4, with equal input and feedback resistors 29, 99 and merely reverses the polarity of the applied voltage.

The potentiometer winding 38 varies in resistance with a complete sinusoidal function. The brushes 26, 27 are rotated by the handwheel 10, Fig. 2, proportionally to $A_2AT$. The voltage selected by the brush 26 will be proportional to $AT \sin A_2AT$, or $X_A$; and the voltage selected by the brush 27 will be proportional to $AT \cos A_2AT$ or $Y_A$.

Voltage of the proper polarity from the tapped source 60 is applied through reversing switch 61 to the potentiometer winding 62. The brush 63 is adjusted to select a voltage proportional to $X_G$ as indicated on dial 264, the X component of the parallax of the gun G with respect to the station A.

The voltages selected by the brushes 26 and 63 are applied through individual resistors 65, 64 to the input of an amplifier 67 of the type shown in Fig. 4, having a feedback resistor 66.

The output voltage of amplifier 67 will be proportional to $X_A + X_G$ or X, Equation 5.

Voltage of the proper polarity from the tapped source 68 is applied through reversing switch 69 to the potentiometer winding 70. The brush 71 is adjusted to select a voltage proportional to $Y_G$ as indicated on dial 265, the Y component of the parallax of the gun G with respect to the station A.

The voltages selected by the brushes 27 and 71 are applied through individual resistors 73, 72 to the input of an amplifier 74, of the type shown in Fig. 4, having a feedback resistor 75.

The output voltage of amplifier 74 will be proportional to $Y_A + Y_G$ or Y, Equation 5.

The output voltages of amplifiers 67, 74 may be supplied through the upper contacts of switch 76 to any desired computing elements 77, which may be of the type shown in application Serial No. 443,920, filed May 21, 1942 by W. H. Boghosian et al and assigned to the assignee of the present application.

Voltage of the proper polarity from the tapped source 79 is supplied through the reversing switch 80 to the potentiometer winding 81. The brush 82 is adjusted to select a voltage proportional to $-X_J$ as indicated on dial 267, the X component of the parallax of station C with respect to the gun G, which is supplied through resistor 83 to the input of an amplifier 84, of the type shown in Fig. 4.

Voltage from the output of amplifier 67 is supplied through the left upper contacts of switch 78 and resistor 85 to the input of amplifier 84, which has a feedback resistor 86.

The output of amplifier 84 is proportional to $X - X_J = X_C$, the X coordinate of the station C with respect to the target T.

Voltage of the proper polarity from the tapped source 87 is supplied through the reversing switch 88 to the potentiometer winding 89. The brush 90 is adjusted to select a voltage proportional to $-Y_J$ as indicated on dial 268, the Y component of the parallax of station C with respect to the gun G, which is supplied through resistor 91 to the input circuit of an amplifier 92 which may be of the type shown in Fig. 4.

Voltage from the output of amplifier 74 is supplied through the right upper contacts of switch 78 and resistor 93 to amplifier 92, which has a feedback resistor 94.

Current from the output of amplifier 84 is supplied directly to the lower sections of the potentiometer winding 41, and, to the input resistor 95 of the amplifier 96, of the type shown in Fig. 4, having a feedback resistor 97. Current from the output of amplifier 96 is supplied to the upper sections of potentiometer winding 41.

Similarly, current from the output of amplifier 92 is supplied directly to the lower sections of the potentiometer winding 42 and to the input resistor 101 of amplifier 98, of the type shown in Fig. 4, having a feedback resistor 100. Current from the output of amplifier 98 is supplied to the upper sections of the potentiometer winding 42.

The potentiometer windings 41, 42 vary in resistance with complete sinusoidal functions. The amplifiers 96, 98 merely reverse the polarity of the voltages applied to the upper sections of the windings.

The brushes 43, 44 are driven by the shaft of motor 40, but are insulated from the shaft and from each other.

The brush 43 selects the positive cosine of the angle of rotation. Assume the brush 43 is rotated through the angle $A_2CT$; then the voltage selected by the brush 43 is proportional to $+X_c \cos A_2CT$ and this voltage is supplied through resistor 45 to the input circuit of amplifier 47.

The brush 44 selects the negative sine of the angle of rotation. Assume the brush 44 is rotated through the angle $A_2CT$. Then the voltage selected by the brush 44 is proportional to $$-Y_c \sin A_2CT$$

and this voltage is supplied through resistor 46 to the input circuit of amplifier 47.

The voltages supplied to the input circuit of amplifier 47 are proportional to $$X_c \cos A_2CT - Y_c \sin A_2CT$$

and as the amplifier 47 which is of the type shown in Fig. 4 reverses the polarity of the applied voltages, the output current of amplifier 47 will be proportional to $$-X_c \cos A_2CT + Y_c \sin A_2CT$$

If the brushes 43, 44 are rotated through the correct angle, from Equation 7, $$-X_c \cos A_2CT + Y_c \sin A_2CT$$

should equal zero and no current will flow from amplifier 47. If the brushes 43, 44 are not rotated through the correct angle, current will flow from the output circuit of the amplifier 47 through the control circuit of the modulator 48, of the type shown in Fig. 5.

A source of power 49 supplies current through a phase shifting network 50 to one phase winding of the two-phase motor 40, and through the modulator 48 to the other phase winding of motor 40. When current flows from the output circuit of amplifier 47 through the control circuit of modulator 48, the motor 40 is started, rotating the brushes 43, 44 until the current from the output circuit of amplifier 47 is reduced to zero and the brushes 43, 44 are rotated to the angle $A_2CT$.

The serially connected resistors 57, 58 form a feedback path for the amplifier 47. The capacitor 59, connected across the feedback path, modifies the response frequency characteristic of the feedback path, so as to stabilize the motor 40 from overrunning and hunting.

The modulator 48 is shown in Fig. 5 and includes the transformers 51, 56 and the lattice formed by the non-linear resistors 52, 53, 54, 55. The resistors 52, 53, 54, 55 may be any non-linear resistors, such as copper-oxide couples, which have a low resistance when a biasing current flows in one direction, and a high resistance when a biasing current flows in the opposite direction. In Fig. 5, the arrows indicate the direction of flow of the biasing current for which the resistance is low.

The source of alternating power 49, Fig. 3, is connected to the primary winding of transformer 51 and the secondary winding of transformer 56 is connected to one winding of the motor 40, Fig. 3. The output current from amplifier 47, Fig. 3, is supplied to the taps in the windings of transformers 51 and 56.

When no biasing current is applied, the resistances of resistors 52, 53, 54, 55 are all high and substantially equal. Assume, at a given instant, the upper end of the secondary winding of transformer 51 is positive. A small current may tend to flow from the secondary winding of transformer 51 through resistor 52 down through the primary winding of transformer 56 and through resistor 55. At the same time, an equal small current may tend to flow from the secondary winding of transformer 51 through resistor 54 up through the secondary winding of transformer 56 and through resistor 53. These small currents will oppose each other in the secondary winding of transformer 56 and no power will be supplied to the winding of motor 40.

Assume that biasing current of positive polarity flows into the tap in the secondary winding of transformer 51, through the two sections of the secondary winding, resistors 52, 55 and the two sections of the primary winding of transformer 56, out from the tap in the primary winding, shifting the operating point so that resistors 52, 55 are of low resistance, without affecting resistors 53, 54. If, at a given instant, the upper end of the secondary winding of transformer 51 is positive, current will flow through resistor 52, down through the primary winding of transformer 56 and through resistor 55. Also, if the upper end of the secondary winding of transformer 51 is negative, current will flow upward in the primary winding of transformer 56. The motor 40 is thus operated in one direction.

On the other hand, assume that biasing current of positive polarity flows into the tap in the primary winding of transformer 56, through the two sections of the primary winding, resistors 53, 54 and the two sections of the secondary winding of transformer 51, out from the tap in the secondary winding, shifting the operating point so that resistors 53, 54 are of low resistance, without affecting resistors 52, 55. If, at a given instant, the upper end of the secondary winding of transformer 51 is positive, current will flow through resistor 54 upward through the primary winding of transformer 56 and through resistor 53. Also, if the upper end of the secondary winding of transformer 51 is negative, current will flow downward in the primary winding of transformer 56. The motor 40 will then rotate in the opposite direction.

Thus, the extent and direction of operation of the motor 40 is controlled by the amplitude and polarity of the biasing current from the output circuit of amplifier 47.

The angle $A_2CT$ of rotation of the shaft of motor 40, Figs. 2 and 3, may be indicated by a dial 266 or a transmission element, such as a synchronous transmitter, and transmitted to observing station C. The operator at Station C sets in this azimuth on his observing instrument and can then identify the target being observed by stations A and B.

Thus, in accordance with the results of the observations of the target transmitted from the observing stations A and B, the system in the upper part of Figs. 2 and 3 has been controlled to produce voltages proportional to the rectangular coordinates of the observed position of the target with respect to the gun, which are available for the control of computing elements and an indication of the azimuth of the target with respect to a third station C.

In the lower parts of Figs. 2 and 3, equipment for stations C and D is shown. As this equipment duplicates the equipment for stations A and B, elements having the same functions as corresponding elements for stations A and B have been given the same reference numbers, increased by 100.

As the operation of the equipment for stations C and D is similar to the operation given above of the equipment for stations A and B, a detailed description of the operation of the equipment for stations C and D is not necessary.

The angle of rotation of motor 40, Fig. 2, may be indicated in any desired manner, such as a graduated indicator 266. This angle is set in by the handwheel 110 and is transmitted by telephone, or other transmission system, to station C. The operator at station C sets his observing instrument to this azimuth, identifies the target, and transmits this identification by any suitable means to station D. Station D commences observing the target, and the combined observations of stations C and D are transmitted to the operator and set in on the handwheels 110, 112, Fig. 2.

When the target has moved so that observation from stations A and B is unfavorable and consistent results are being received from stations C and D, switch 76, Figs. 2 and 3, may be operated to the lower contacts, thus controlling the computing elements 77 with voltages derived from observation made by stations C and D.

The components of the parallax of any other station, such as station A, may be set in on potentiometer brushes 82 and 90 and switch 78 operated to the lower contacts. The motor 40 will then rotate to the azimuth of such other station.

While a specific type of computing system has been described, using two observing stations to control the production of voltages or currents proportional to the X and Y coordinates of the target with respect to the gun, other known systems, such for example, as the system shown in British Patent 164,765 to P. W. Willans, may be used to obtain these voltages or currents.

What is claimed is:

1. In an artillery computer, a first grounded source of voltage, a first potentiometer winding having a sinusoidal variation of resistance connected to said first source and grounded at an intermediate tap and a first brush moved in accordance with the angle between a first base-line and the line from one end of said base-line to a target, a second grounded potentiometer winding connected to said first brush and a second brush adjusted to the length of said first base-line, a first amplifier having a grounded input circuit connected to said second brush and a grounded output circuit, a third potentiometer winding connected across said output circuit and a third brush moved in accordance with the angle at said target subtended by said base-line connected to said input circuit, a fourth potentiometer winding having a sinusoidal variation in resistance and fourth and fifth brushes moved in accordance with the azimuth of said target with respect to said one end of said base-line, a first tap on said fourth winding being connected to the output circuit of said amplifier, polarity reversing means, a second tap on said fourth winding diametrically opposite to said first tap being connected through said polarity reversing means to said output circuit, the equidistant intermediate points of said fourth winding being grounded, a second grounded source of voltage, a fifth potentiometer winding connected across said second source of voltage and a sixth brush adjusted to select a voltage proportional to the X component of the parallax from said one end of said base-line to a gun, first thermionic means for adding the voltages from said fourth and sixth brushes to produce a voltage proportional to the X coordinate of said target with respect to said gun, a third grounded source of voltage, a sixth potentiometer winding connected across said third source of voltage and a seventh brush adjusted to select a voltage proportional to the Y component of the parallax from said end of said base-line to said gun, second thermionic means for adding the voltages from said fifth and seventh brushes to produce a voltage proportional to the Y coordinate of said target with respect to said gun, a fourth grounded source of voltage, a seventh potentiometer winding connected across said fourth source of voltage and an eighth brush adjusted to select a voltage proportional to the X component of the parallax from said gun to one end of a second base-line, third thermionic means for algebraically adding the voltage from said eighth brush to the voltage from said first thermionic means, an eighth potentiometer winding having a sinusoidal variation of resistance, second polarity reversing means, said third thermionic means being connected directly to a first tap on said eighth winding and through said second polarity reversing means to a second diametrically opposite tap on said eighth winding, the equidistant intermediate points of said eighth winding being grounded, a fifth grounded source of voltage, a ninth potentiometer winding connected across said fifth source of voltage and a ninth brush adjusted to select a voltage proportional to the Y component of the parallax from said gun to said end of said second base-line, fourth thermionic means for algebraically adding the voltage from said ninth brush to the voltage from said second thermionic means, a tenth potentiometer winding having a sinusoidal variation of resistance, third polarity reversing means, said fourth thermionic means being connected directly to a first tap on said tenth winding and through said third polarity reversing means to a second diametrically opposite tap on said tenth winding, the equidistant, intermediate points of said tenth winding being grounded, a tenth brush rubbing on said eighth winding and an eleventh brush rubbing on said tenth winding, a motor, fifth thermionic means for adding the voltages from said tenth and eleventh brushes and controlling said motor with the sum of said voltages, whereby said motor is rotated to the azimuth of said target from said end of said second base-line.

2. In an artillery computer, a source of a first voltage proportional to the distance from an observing station to a target, first potentiometer means for fractionating the voltage from said source to produce second and third voltages, respectively, proportional to the X and Y coordinates of said target with respect to said station, sources of fourth and fifth voltages adjusted to be respectively equal to the X and Y components of the parallax of said station with respect to a gun, first thermionic means for adding said second and fourth voltages, second thermionic means for adding said third and fifth voltages, sources of sixth and seventh voltages respectively equal to the X and Y components of the parallax of a second observing station to said gun, third thermionic means for adding said sixth voltage to the voltage from said first thermionic means, a first potentiometer having a winding connected to said third thermionic means and a first rotatable brush selecting an eighth voltage proportional to the cosine of the angle of rotation of said brush, fourth thermionic means for adding said seventh voltage to the voltage from said second thermionic means, a second potentiometer having a winding connected to said fourth thermionic means, and a second rotatable brush selecting a ninth voltage proportional to the sine of the angle of rotation of said brush, a motor rotating said brushes and fifth thermionic means for algebraically adding the voltages from said brushes to control said motor, to rotate said brushes to make the sum of said voltages zero, whereby the angle of rotation of said brushes indicates the azimuth of said target with respect to said second station.

3. In an artillery computer, sources of first and second voltages respectively proportional to the X and Y coordinates of a target with respect to a gun, sources of third and fourth voltages respectively proportional to the X and Y components of the parallax from said gun to an observing station, a first amplifier having an input circuit connected to the sources of said first and third voltages and an output circuit, a first potentiometer connected to the output circuit of said first amplifier and a first rotatable brush selecting a voltage proportional to the cosine of the angle of rotation of said brush, a second amplifier having an input circuit connected to the sources of said second and fourth voltages and an output circuit, a second potentiometer connected to the output circuit of said second amplifier and a second rotatable brush selecting a voltage proportional to the sine of the angle of rotation of said second brush, a motor rotating said brushes, and a third amplifier having an input circuit connected to said brushes and an output circuit controlling said motor to rotate said brushes until the voltages supplied to the input circuit of said third amplifier are reduced to zero, whereby the rotation of said brushes indicates the azimuth of said target with respect to said observing station.

4. In a computer, a source of voltage, first means for selecting from said source first and second voltages respectively proportional to the sides of a first right triangle, the hypotenuse of which joins first and second spaced points, other means for selecting third and fourth voltages respectively proportional to the components of the differences in length between the sides of said first right triangle and the corresponding sides of a second right triangle having sides respectively parallel to the sides of said first triangle and a hypotenuse joining said first and a third spaced point, first electrical means connected to said selecting means for algebraically adding said first and third voltages, second electrical means connected to said selecting means for algebraically adding said second and fourth voltages, a motor, and controlling means connected to both said electrical means and said motor to cause said motor to rotate proportionally to an angle of said second triangle.

5. In a computer, a source of a first voltage, electrical means connected to said source for successively fractionating the voltage from said source proportionally to the sine of one angle of a triangle and to the base of said triangle adjacent said angle, an amplifier having an input and an output circuit, other electrical means connected to said output circuit for fractionating the output voltage of said amplifier proportionally to the sine of the angle of said triangle subtending said base, means for connecting both said electrical means to said input circuit, and electrical computing means connected to said output circuit.

6. In a computer, a source of a physical quantity, means controlled by observations of an object from a first station to derive from said source other physical quantities proportional to the coordinates with respect to selected arbitrary axes of said station from said object, other means connected to said first means and adjusted to modify said other quantities proportionally to the coordinates with respect to said axes of a second station from said object, a motor, and control means connected to said other means and said motor to cause said motor to rotate proportionally to the angle between the line from said object to said second station and one of said axes.

WILLIAM H. BOGHOSIAN.
HENRY G. OCH.

REFERENCES CITED

The following references are of record in the file of this patent:

UNITED STATES PATENTS

| Number | Name | Date |
|---|---|---|
| 1,154,252 | Kennedy | Sept. 21, 1915 |
| 1,345,706 | Routin | July 6, 1920 |
| 1,755,975 | Willard | Apr. 22, 1930 |
| 2,159,181 | Ryder | May 23, 1939 |